United States Patent
Brisard

[11] 3,815,404
[45] June 11, 1974

[54] VEHICLE SUSPENSION CHECKING APPARATUS

[75] Inventor: Gerard Brisard, Fontenay-sous-Bois, France

[73] Assignee: Etablissements Muller & Cie, Paris, France; a part interest

[22] Filed: Oct. 20, 1972

[21] Appl. No.: 299,239

[30] Foreign Application Priority Data
Nov. 8, 1971 France .............................. 71.39956

[52] U.S. Cl. ...................................... 73/11, 73/71.7
[51] Int. Cl. .......................................... G01m 17/04
[58] Field of Search ..................... 73/11, 71.6, 71, 7

[56] References Cited
UNITED STATES PATENTS
| | | | |
|---|---|---|---|
| 2,934,940 | 5/1960 | Beissbarth | 73/71.7 |
| 3,690,145 | 9/1972 | Brisard | 73/71.7 |
| 3,720,091 | 3/1973 | Kiefer | 73/71.7 |

*Primary Examiner*—Richard C. Queisser
*Assistant Examiner*—Stephen A. Kreitman

[57] ABSTRACT

Apparatus for checking the suspension systems of vehicles, which comprises a vibrating plate adapted to receive one wheel of the vehicle, as well as mechanical means adapted to impart to said plate vertical oscillations and detector means for controlling the wheel oscillations. Said vibrating plate is pivoted at one end about a horizontal hinged shaft and bears on the floor or a fixed base plate through at least one relatively stiff spring, means adapted to impart oscillations to said vibrating plate acting on said plate through the medium of one or a plurality of separate springs. The means for controlling said wheel oscillations consists of a device capable of detecting and measuring either the amplitude of the oscillatory movements of said plate or the value of its accelerations, or alternatively the variations in the force developing between said vibrating plate and one of the springs associated therewith, or between said vibrating plate and the tyre of the wheel being checked.

5 Claims, 2 Drawing Figures

VEHICLE SUSPENSION CHECKING APPARATUS

The present invention relates to apparatus designed for checking the proper operation of the suspension systems of land vehicles, more particularly of the shock absorbers associated with the wheels of these vehicles, without any recourse to the removal or disassembling of the members to be checked.

Various types of apparatus have already been proposed for this purpose. Some of them are designed for imparting a certain motion to the sprung mass of a vehicle. However, these apparatus are objectionable in that they are particularly expensive and do not give accurate measurements.

Other known apparatus are of simpler design because they are intended for imparting vertical oscillations to only one wheel of the vehicle at a time, by using a so-called vibrating plate adapted to receive the wheel. However, these apparatus are not fully satisfactory for the values of the measurements thus made are affected by various parameters such as the specific properties of the tyre equipping each wheel. On the other hand, these apparatus are not capable of giving homogeneous results when used with vehicles having very different mass values.

It is therefore the essential object of the present invention to provide a suspension checking apparatus of the same general type, i.e. an apparatus comprising a vibrating plate but designed with a view to eliminate as far as possible the influence likely to be exerted on the measurements by the characteristics of the tyre equipping the wheel to be checked. Moreover, this apparatus is designed with a view to operate with the maximum sensitivity and to give very homogeneous results irrespective of the magnitude of the mass values of the vehicles to be checked.

To this end, the vibrating plate of this apparatus is pivoted at one end and bears on the fixed floor or base structure through at least one relatively stiff spring, and means adapted to impart to said vibrating plate oscillations transmitted thereto through one or a plurality of springs. The means provided for controlling the oscillations of said vibrating plate may be of any suitable type. Thus, they may consist of a device capable of detecting and measuring the amplitude of the oscillatory movements of the vibrating plate, or of a system capable of measuring its accelerations, or alternatively of a device for measuring the variations of forces exerted between this vibrating plate and one or the other spring associated therewith, or between this vibrating plate and the tyre of the wheel being tested.

Whatever the detection device utilized it is the essential advantage of the present apparatus to afford high-sensitivity measurements definitely free from the influence of variations either in the characteristics of the tyres equipping the wheels to be checked, or in the mass values of the tested vehicles. This advantageous feature is due on the one hand to the fact that the vibrating plate of the apparatus of the present invention is supported by relatively stiff springs and on the other hand to the fact that the means transmitting the oscillations to this plate engage the latter also through spring means.

However, other features and advantages characterising this invention will appear as the following description proceeds with reference to the accompanying drawing illustrating diagrammatically by way of example a typical form of embodiment thereof.

Figure 1:
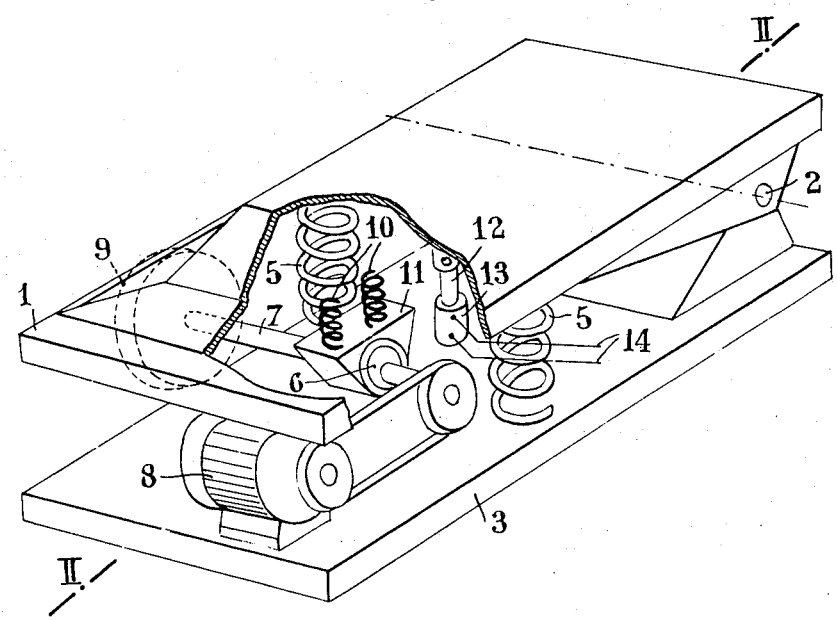
FIG. 1 is a perspective view with parts broken away of the apparatus.
Figure 2:
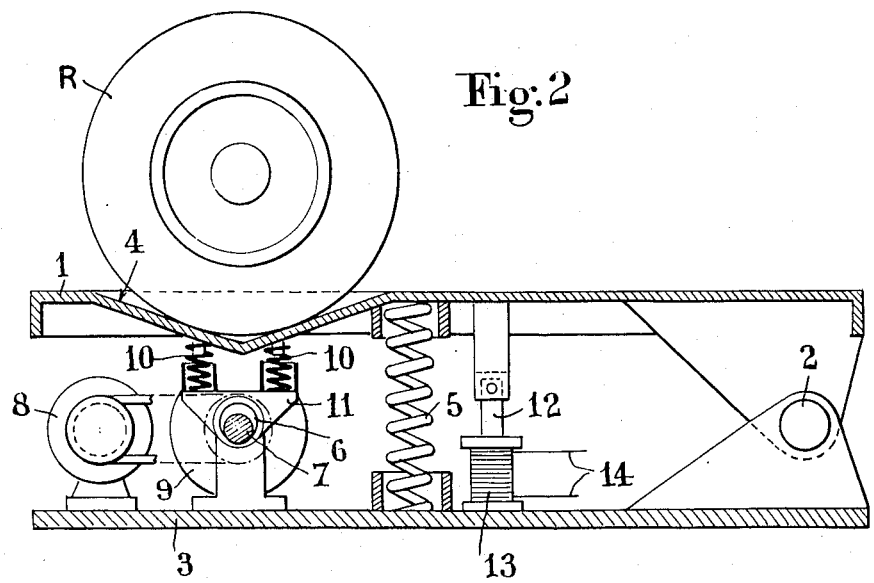
FIG. 2 is a vertical section taken along the line II—II of FIG. 1.

The apparatus illustrated comprises a vibrating plate 1 adapted to receive the wheel R of a vehicle for checking the proper operation of its suspension system or, more exactly stated, the condition of the shock-absorber associated with this wheel. At one end, this plate 1 is pivotally connected through a horizontal pivot shaft 2 to an underlying base plate 3 and bear its opposite end the plate 1 has a concavity or recess 4 formed therein for receiving the wheel R of which the suspension is to be checked.

According to an essential feature characterising this invention the plate 1 bears on one or a plurality of relatively stiff springs, for example two springs 5 disposed on either side of the longitudinal centre line of the apparatus between this vibrating plate 1 and the fixed base plate 3.

The means for imparting vertical oscillations to this vibrating plate 1 comprise an eccentric 6 rigid with a rotary shaft 7 driven from a motor 8. This shaft 7 carries preferably an inertia flywheel 9 adapted to permit a variation in the frequency of oscillation of the movable plate 1.

According to another essential feature characterising this invention, the means thus contemplate act on said plate 1 through the medium of one or a plurality of springs. Thus, in the example illustrated, two springs 10 are interposed between the vibrating plate 1 and the eccentric 6 or more exactly a strap 11 bearing on this eccentric. Under these conditions, these springs act as transmission members for impressing vertical oscillations to the movable plate 1.

In the same construction the means for controlling the oscillations of the movable plate 1 consist of a device adapted to detect and measure the amplitude of said oscillations. This device comprises an electromagnetic pickup of the induction type, of which the movable magnet core 12 is attached to the vibrating plate 1 and the winding 13 is attached to the fixed base plate 3.

The ends of winding 13 are connected through lead wires 14 to an electric measuring circuit (not shown) adapted to measure the magnitude of the amplitude of the movements performed by the plunger core 12. This circuit may comprise for instance a dial-type measuring instrument permitting a direct reading of the measured values. However, a recording apparatus may also be associated therewith for inscribing on a chart the amplitude of the oscillatory movements performed by the vibrating plate 1.

Of course, this circuit may also comprise simultaneously a dial-type display instrument and a recording apparatus.

For checking the suspension of a wheel R, the assembly comprising the oscillating plate 1 and the half-axle to be tested is caused to vibrate. This vibratory motion is obtained through said springs 10 via the eccentric 6 generating oscillations of suitable amplitude and of which the frequency may vary, for example by driving the shaft 7 at a speed definitely higher than that corresponding to the resonance frequency of the assembly (more than 20 Hz in the case of a wheel and of the corresponding half-axle). Then the speed of shaft 7 is allowed to drop for measuring the resonance frequency of the oscillating assembly.

As already explained in the foregoing, this measurement is obtained by using the detector means consisting of the electromagnetic pickup 13. In this respect it may be noted that the lower the damping action exerted on the wheel-supporting movable plate 1, the higher the amplitude of the oscillations imparted thereto, especially at the resonance frequency of the assembly. Therefore, a high oscillation frequency means that the shock absorber associated with the wheel being checked is no more capable of operating properly.

Due to the particular principle of operation of the present apparatus the measurements made therewith are very moderately sensitive to variations in the characteristics of the tyre equipping each wheel during the checking operation. As already mentioned in the foregoing, this is due to the fact that the oscillating plate 1 is suspended by means of springs 5 and that on the other hand this plate is caused to oscillate also through the medium of different springs, namely springs 10.

In this respect, it may be pointed out that the springs 5 are stiff enough to permit of dispensing with any vertical correction between a light vehicle and a heavy one. However, these springs should nevertheless preserve a sufficient flexibility to attenuate as much as possible the influence likely to be exerted by the wheel tyre for damping out the vibrations of the assembly to which testing oscillations are imparted.

Moreover, the combination of these two separate resilient assemblies adapted the one to support the vibrating assembly and the other to impart vibrations to this assembly, is also advantageous in that it provides particularly homogeneous results with vehicles having very different mass values, and also with tyres having very different characteristics, so that the range of useful sensitivities in the case of measurements of damping values is ultimately reduced.

The use of relatively stiff springs for supporting the oscillating plate 1 is permitted thanks to the use of a detector and pickup device affording the necessary amplification of the detected variations, with a satisfactory degree of sensitivity.

The springs 10 are initially less stiff than the springs 5 but they are shorter. Thus the stiffness of the springs 10 increase more quickly when the checked vehicle is more heavy.

In the example illustrated the detector means comprise as already explained a variable-flux electromagnetic device connected to a suitable circuit advantageously designed with a view to remove any stray current variations detected especially in the range of useful frequencies.

However, an inertia pickup device may also be used; in this case, this device is attached to the oscillating plate 1 so as to record its accelerations. In fact, these accelerations are inversely proportional to the magnitude of the oscillation damping effect. However, it is also possible to use a force variation pickup by interposing for example this pickup between the plate 1 and springs 10 or springs 5. However, this force variation pickup may also be interposed between the tyre of wheel R being checked and the movable plate 1. In this last example the force variations detected by the device increase as the damping action decreases.

From the foregoing it is clear that various detector means may be implemented for carrying out the present invention. Besides, it is clear that the apparatus constituting the subject-matter of the present invention should not be construed as being limited by the specific form of embodiment shown and described herein.

Thus, the suspension of the oscillating plate 1 by means of springs may also be obtained differently, this plate being attached for example to springs disposed above it and anchored to suitable support means.

On the other hand, any types of springs may be used. The oscillation generating means may also differ from those illustrated, provided that they act on the plate 1 through spring means.

What I claim is:

1. An apparatus for checking the suspension systems of vehicles, comprising
    a base,
    a horizontal pivot shaft provided on said base,
    a vibrating platform pivoted at one end about said shaft, at least one first spring between the other end of said platform and said base, means adapted to impart to said platform vertical oscillations, at least one second spring between said means and said platform, whereby said spring transmits oscillations from said means to effect the oscillations of said platform, detector means adapted to measure the oscillations of said vibrating platform.

2. An apparatus according to claim 1 in which said detector means consist of a device capable of detecting and measuring the amplitude of the oscillatory movements of said platform.

3. An apparatus according to claim 1 in which said detector means consist of a device capable of detecting and measuring the variations in the force developing between said vibrating platform and one of the springs associated therewith.

4. An apparatus according to claim 1 in which said detector means consist of a device capable of detecting and measuring the variations in the force developing between said vibrating platform and the tyre of the wheel being checked.

5. An apparatus according to claim 1, in which the means adapted to impart oscillations to said vibrating platform comprise an eccentric mechanism rotatably driven from a suitable motor and having its shaft provided with an inertia flywheel, said eccentric being disposed under said vibrating platform, whereby the latter can bear thereagainst through the second spring acting as oscillation transmission member.

* * * * *